United States Patent Office 2,825,369
Patented Mar. 4, 1958

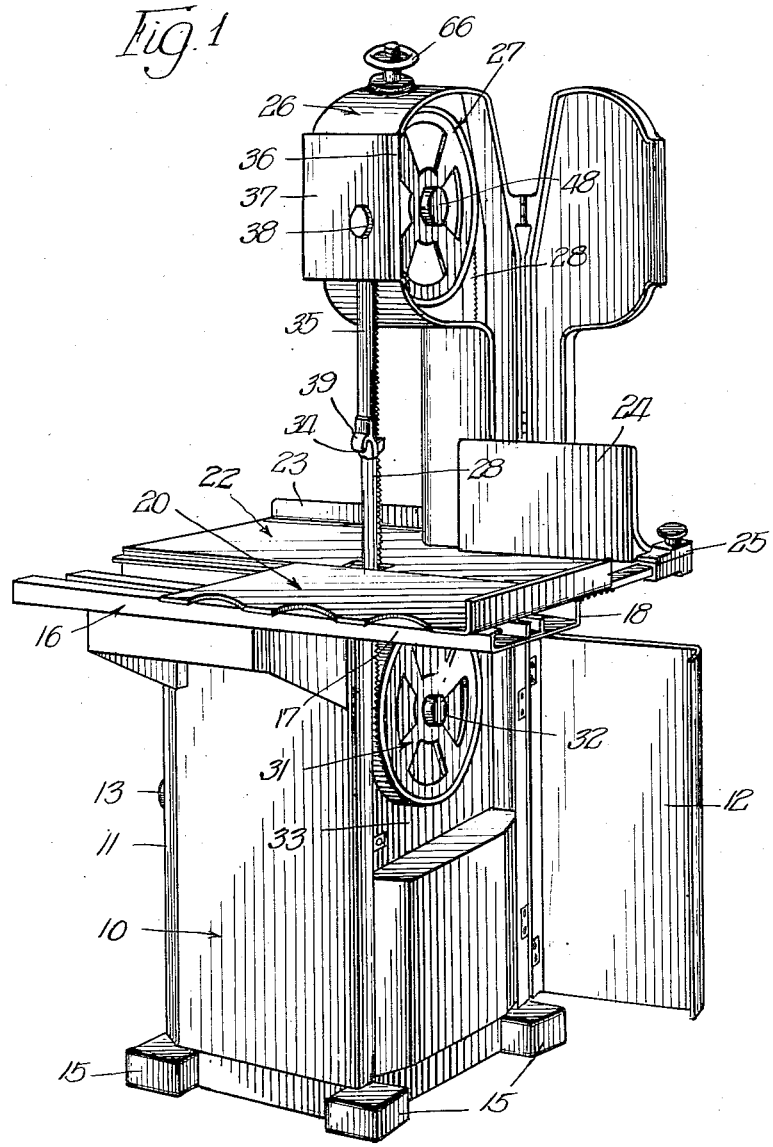

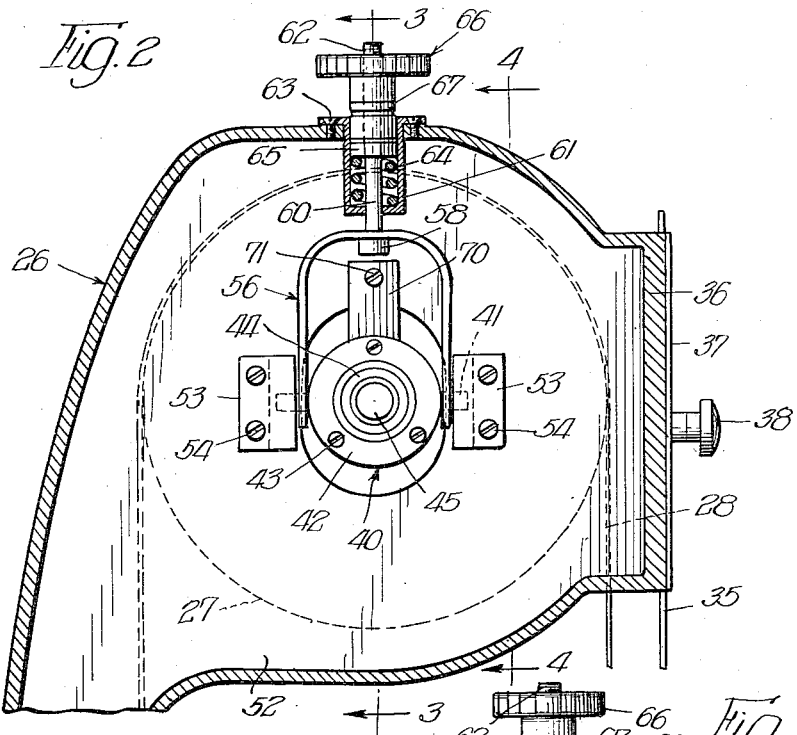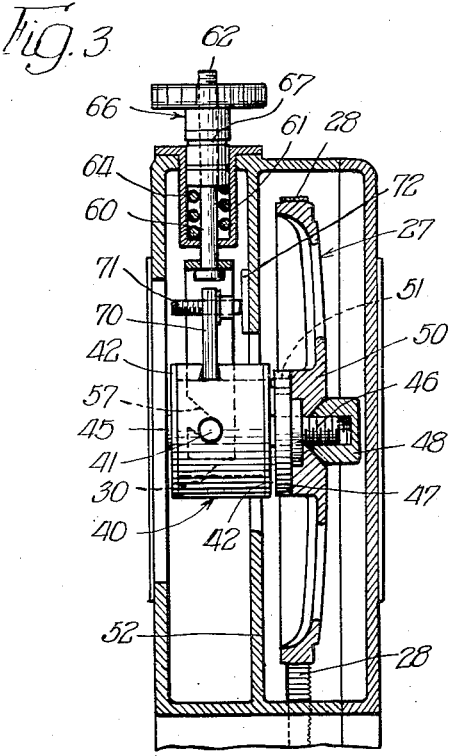

2,825,369

PULLEY MOUNTING DEVICE FOR MEAT SAW WITH TENSIONING MEANS THEREFOR

Edward C. Karp, Belvidere, and Sven G. Berglund, Rockford, Ill., assignors to Sanitary Scale Company, Belvidere, Ill., a corporation of Illinois Application March 29, 1956, Serial No. 574,798

2 Claims. (Cl. 143—27)

The invention relates to power meat saws of the type employing a saw blade in the form of a continuous metal band and has reference more particularly to a meat cutting device of this character having a novel and improved hanger assembly providing journalling means for the top pulley of the band saw.

One of the objects of the invention is to provide a hanger assembly for the top pulley of a continuous band saw as employed in meat cutting devices which will be adjustable vertically for varying the tension on the band saw and wherein the said hanger assembly will additionally incorporate a pivotally adjustable bearing member whereby the shaft which journals the top pulley can be adjusted with respect to the horizontal to insure proper tracking of the band saw.

A more specific object of the invention is to provide a power meat saw of the type described which will incorporate mechanism for supporting the hanger assembly and which in turn will be adjustably supported from the frame of the meat cutting device so that the position of the hanger assembly can be varied in a direction parallel to the longitudinal axis of the band saw whereby improved means are provided for manually varying the tension on the band saw.

Another object of the invention resides in the provision of improved supporting mechanism for a hanger assembly as above described which will incorporate a bearing member, said member being pivotally supported by the hanger assembly and thus being adjustable with respect to the horizontal so as to vary the position of the top pulley as regards its vertical alignment, whereby to facilitate proper tracking of the band saw and improvement in the operation of the meat cutting device.

A further object of the invention is to provide a hanger assembly for supporting the top pulley of the band saw, said assembly including a bearing member for journalling the shaft and which in turn mounts the top pulley, and wherein said assembly also includes a yoke for pivotally supporting the bearing member by means of laterally extending pintles whereby the entire assembly may be adjusted vertically by varying the position of the yoke member, with the horizontal positioning of the shaft being adjustable independently thereof as a result of the pivotal support of the bearing member by means of its laterally extending pintles.

A further object is to provide a factory pre-calibrated tension device for a power meat saw which in combination will include an adjusting knob for varying the tension on the band saw, the said knob having an indicator line formed thereon which when positioned flush with the top mounting plate will assure an accurate and safe cut with the minimum of wear.

With these and various other objects in view, the invention may consist of certain novel features of construction and operation as will be more fully described and particularly pointed out in the specification, drawings and claims appended thereto.

In the drawings which illustrate an embodiment of the invention and wherein like reference characters are used to designate like parts—

Figure 1 is a perspective view of a power meat saw embodying the improved features of the present invention;

Figure 2 is an elevational view, parts being shown in section, of the adjustable hanger assembly for the top pulley of the band saw mechanism;

Figure 3 is a sectional view taken substantially along line 3—3 of Figure 2; and Figure 4 is a sectional view taken substantially along line 4—4 of Figure 2.

The power meat saw selected for illustrating the present invention is best shown in Figure 1 wherein the construction includes a base generally indicated by numeral 10, having two side doors 11 and 12 provided with door knobs such as 13, the said base 10 being suitably elevated from the floor by means of a base support 15, which is so constructed as to make possible easier floor cleaning. The base 10 is also provided with a top frame member 16 which is formed to provide side channels 17 and 18 for accommodating rollers (not shown) for mounting the table 20 for back and forth reciprocating movement with respect to the said top frame member.

The base 10 of the present meat saw is additionally provided with a back or rear work table 22 having a rear flange such as 23. The back table 22, which is preferably hinged to the base 10 along the left hand edge thereof to permit pivoting of the table, is provided along its right hand edge with a gage plate 24 for accurately gauging the thickness of the slice to be cut by the band saw. The adjusting mechanism for the gauge plate, and which mounts the plate on the right hand edge of the table 22, includes a carriage 25, the same incorporating a ratchet lock and release lever (not shown) whereby the operator by manipulation of the lever can free the gage plate, permitting transverse movement thereof. For a more particular description of the power meat saw as described, including the pivoted back table and adjustable gage plate, reference is made to applicants' copending application Serial No. 559,024, filed January 13, 1956, and entitled Meat Saw.

Projecting upwardly from the base 10 and rearwardly of the back table 22 is a band saw and pulley housing 26, the same accommodating the upper pulley 27 and the band saw 28. The upper pulley 27 is fixed to shaft 30, the said shaft being suitably journalled for rotation by structure to be presently described in detail. The lower pulley 31 for the band saw is located within the base 10 and said lower pulley is suitably journalled by shaft 32 provided for the purpose and which is driven by power means (not shown) located within the base on the opposite side of the intermediate wall 33. The band saw 28 is accordingly mounted by the upper and lower pulleys 27 and 31 in a manner to permit movement of the band saw for performing a cutting operation, during which operation a selected portion of meat is placed on the reciprocating table 20, and after the thickness of the cut has been adjusted by means of the slice thickness guide or gage plate 24, the reciprocating table is moved to the left to bring the meat into contact with the cutting edge of the band saw 28.

It is desirable to guide the band saw at a point intermediate the pulley housing 26 and the work tables 20 and 22. Accordingly, a guide for the band saw 28 is provided, the same being identified by numeral 34, and which is suspended from housing 26 in a manner permitting up and down movement of the guide whereby its guiding effect on the band saw can be adjusted within limits. The blade guide 34 is secured to a slidable stem 35 which is mounted for slidable movement in the front plate 36 of housing 26, and the stem is maintained in operative relation by the retaining plate 37. The knob 38 enables the operator to lock said stem in any position while resiliently held in any vertical position within the limits of its movement by spring pressure maintained against a friction disc. For said adjustment the operator grasps the finger piece 39 and the blade guide can be moved either up or down and then left in a particular vertical position such as may be desired by the operator.

The invention provides a hanger assembly, as best shown in Figures 2, 3 and 4, for supporting the shaft 30. Referring more particularly to Figures 2 and 3, the said shaft 30 at the left hand end thereof is journalled by means of a cylindrical bearing member 40 which has pintles 41 projecting therefrom on diametrically opposite sides. The bearing assembly includes a pair of end closure plates 42, which are suitably secured to the bearing member by means of screws 43, and which retain the journalled portion of the shaft within the said bearing member and in operative association with ball-bearing devices such as 44. Both ends of the shaft project through the center openings in their respective ball-bearing devices, as, for example the end 45 projects through the center opening provided therefor in the left hand ball-bearing device 44. In a similar manner the end 46 projects through an opening provided therefor in the right hand ball-bearing device. This end 46 receives the backing plate 47 which is secured thereto by means of a press fit and copper braze so that the backing plate rotates with the shaft 30. The remaining portion of said end 46 is threaded for receiving the tapered threaded locking nut 48, which functions to secure the upper pulley 27 to the said shaft 30 and piloted backing plate 47. The hub 50 of the pulley 27 is provided with a pin 51 which is received in a slot provided therefor in the backing plate 47. When the upper pulley 27 has been thus mounted on the reduced end 46 of shaft 30 the tapered nut 48 is threaded on the end of the shaft and said nut functions to lock the upper pulley to the shaft and backing plate, with the pin and slot connection assuring rotation of the shaft upon operation of the pulley.

The intermediate wall 52 of the housing 26 provides a pair of retainer flanges 53, suitably held to the wall by the screws 54 and which are approximately L-shaped in cross section, whereby the top ledge of each flange has overlying relation with its respective pintle 41 and which accordingly functions as a retaining member for the said pintle so that the pintles and thus the bearing member are guided in their vertical movement, which takes place upon vertical adjustment of the yoke of the hanger assembly.

The said yoke is indicated by numeral 56, the same having angular slots 57 formed in the lower end of each arm of the yoke for receiving one of the pintles 41. The hub 58, which may be formed integral with the yoke, or which may be welded thereto, provides means for fixedly attaching the stud 60 to the yoke, whereby the stud, the hub portion and the yoke constitute a unitary assembly. The stud 60 extends through the cup member 61 to project some distance above the cup member and this top projecting end of the stud 60 is threaded as indicated by numeral 62. The cup member 61 has top overlying flanges which receive retaining screws 63 for fastening the cup member to the pulley housing, with the cylindrical body portion of the cup member depending within the housing. The stud 60 of the yoke extends through the coil spring 64, through the friction washer and thrust bearing 65, and through the indicating knob 66, the indicating knob being threaded on said end 62 of the stud. The coil spring 64 is confined between the bottom of the cup member and the friction washer and thrust bearing 65 and accordingly the yoke 56 is resiliently suspended by said coil spring, with adjustment, as regards the vertical positioning of the yoke, being effected by manipulation of the indicator knob 66. The yoke in turn supports the bearing member 40 due to the pivotal connection of the yoke with the pintles 41, and thus the bearing member, the shaft 30 journalled thereby, and the upper pulley 27 are adjustable vertically for varying the tension to which the band saw is subjected. The desired tension on the band saw is secured by rotating the indicator knob 66. When the knob is rotated in one direction it will travel downwardly on the threads 62, thus elevating the hanger assembly to increase the tension on the band saw. Conversely, when the knob 66 is rotated in a reverse direction, it will travel upwardly on the threads 62, and as a result the hanger assembly will be lowered to decrease the tension on the band saw.

The cylindrical portion of the indicator knob 66 may be used as an indicator of the tension applied to the band saw independent of variations in blade length since the extent to which said sleeve may project above the top of the cup member 61 will vary inversely as the applied tension. Accordingly, an indicator line 67 can be formed on the cylindrical portion of the indicator knob and when the indicator line is approximately flush with the top of the cup member the operator will know that the band saw is under the proper tension. Excessive tension will overload the bearings and might even cause the band saw to break, whereas, too little tension will permit the band saw to wander. With proper tension the saw blade will cut accurately, safely, and with a minimum of wear.

The hanger assembly has a further adjustment for shaft 30, as best illustrated in Figure 3. The bearing member 40 has the stem 70 suitably brazed thereto and so located on the top side of the bearing member as to project upwardly therefrom. Said stem at its top end carries the set screw 71 which has contact with member 72 fixed to the intermediate wall 52 on the left side of said wall. Thus by adjusting the set screw 71 the horizontal positioning of the bearing member 40 and thus the horizontal positioning of shaft 30 can be varied. It is possible to position shaft 40 on the exact horizontal whereby to locate the upper pulley 27 on the true vertical. It is also possible to so locate set screw 71 as to tilt the threaded end 46 of the shaft 30 in an upward direction or to lower said threaded end whereby the vertical inclination of the upper pulley can be adjusted for the best tracking of the band saw on said pulley.

Accordingly, the upper pulley for the band saw of the meat cutting device as disclosed can be adjusted vertically to vary the tension on the band saw and the same can also be adjusted to vary its tilt or inclination with respect to the vertical. The bearing assembly, including the member 40 having the side pintles 41, is pivotally suspended from the spaced arms of the yoke 56. Whatever may be the vertical adjustment as regards the yoke it is possible to vary the tilt of the bearing assembly independently thereof. Also rotation of the indicator knob 66 to vary the tension on the band saw will not affect the setting of the set screw 71, which determines the tilt adjustment for the bearing.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a power meat saw, the combination with a base member providing an upstanding pulley housing, an upper pulley located within and journalled by said pulley housing, a lower pulley located within and journalled by said base member, a band saw supported at respective ends by said pulleys, the journalling means for said upper pulley including a bearing member having laterally projecting pintles, a shaft having one end thereof rotatably mounted in the bearing member and having the upper pulley mounted on its opposite projecting end, a yoke providing spaced depending arms having slots therein for receiving the pintles respectively whereby to pivotally support the said bearing member, a threaded stud portion projecting upwardly from the center of the yoke, a cup member supported by the top wall and depending therefrom, said threaded stud portion extending through the cup member to project above the top wall of the housing, a coil spring within the cup member in surrounding relation with the threaded stud portion, an adjustment knob threaded to the projecting end of the stud, whereby said coil spring is confined between the cup member and the adjustment knob so that upon rotation of the knob the yoke can be adjusted vertically to in turn adjust the vertical position of the bearing member, an intermediate wall provided by the pulley housing and disposed between the yoke and the upper pulley, retainer flanges fixed to said wall on the yoke side and providing vertical passageways parallel with the wall for receiving said pintles, a stem fixed to the bearing member and projecting upwardly therefrom between the depending arms of the yoke, and a set screw threaded into the stem at its upper end and having contact with said wall also on the yoke side, whereby adjustment of the set screw will operate to vary the horizontal disposition of the shaft and thus the vertical alignment of said upper pulley.

2. In a power meat saw as defined by claim 1, wherein the shaft for the upper pulley has said opposite projecting end reduced in diameter and exteriorly threaded, wherein the bearing member mounts the shaft for rotation with the threaded reduced end projecting exteriorly of the bearing member and to the pulley side of the intermediate wall, and additionally including a retainer nut on the threaded reduced end of the shaft for fixedly securing the upper pulley to the said shaft.

References Cited in the file of this patent
UNITED STATES PATENTS

| | | |
|---|---|---|
| 2,463,437 | Steiner | Mar. 1, 1949 |
| 2,481,675 | Lasar | Sept. 13, 1949 |
| 2,525,004 | Spang | Oct. 10, 1950 |
| 2,617,451 | Fink et al. | Nov. 11, 1952 |